Figure 1:
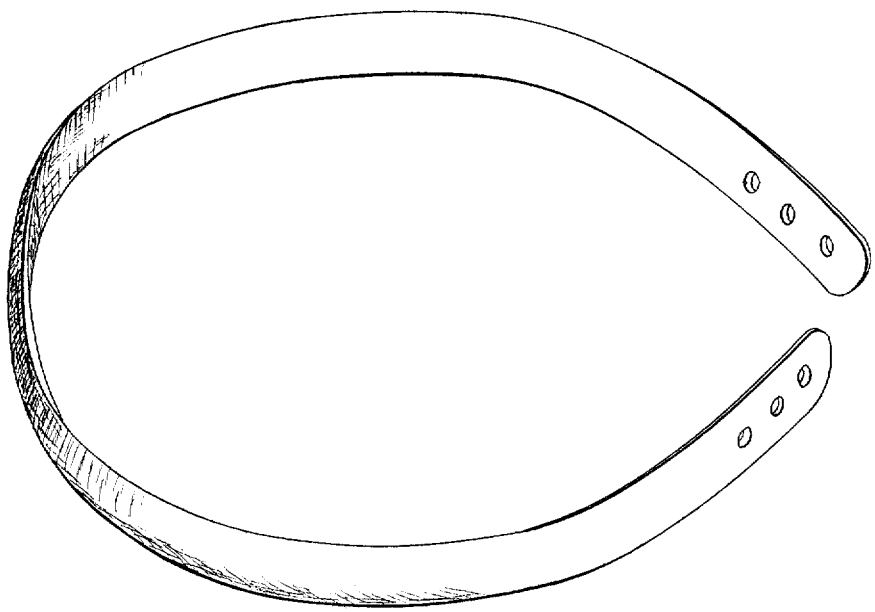
Figure 1:

J. W. Riggs,
Truss Spring.
N° 22,674. Patented Jan. 18, 1859.

Fig. 2,

Witnesses:
S. H. Maynard
George H. Mott.

Inventor.
J. W. Riggs

UNITED STATES PATENT OFFICE.

JOHN W. RIGGS, OF NEW YORK, N. Y.

TRUSS-SPRING.

Specification forming part of Letters Patent No. 22,674, dated January 18, 1859; Reissued October 10, 1871, No. 4,589.

*To all whom it may concern:*

Be it known that I, JOHN W. RIGGS, of New York, county of New York, and State of New York, have invented certain new and useful Improvements in the Construction of Truss-Springs; and I do hereby declare that the following is a full, clear, and exact description of the same, reference being made to the annexed drawing, making a part of this specification, which are fully described herein—that is to say:

My improvement in truss springs has for its object the obtaining of several qualities not heretofore secured in that article of manufacture. The first is to obtain the requisite amount of pressure with the least possible weight of material; secondly, to avoid the disagreeable effects of the heat and the moisture of the body upon the spring covering, thus also promoting cleanliness; and thirdly, by the same means to protect the metal of the spring from corrosion.

The weight and proper stiffness of the spring is a matter of the first importance in the construction of a truss for the cure of hernia, the stiffness to regulate the pressure upon the pads requiring to be of different degrees according to the circumstances of the case. When the pressure is required to be great, it necessitates either a very heavy spring, or else one so highly tempered as to be liable to be easily broken.

My improvement consists in coating the steel or other metal of the spring with a composition which has elasticity and a sufficient degree of hardness, and which is also anti-corrosive in its character. Hard rubber or gutta percha affords such a material, and by the use thereof I am enabled to construct springs of the required different degrees of elasticity upon one uniform size of steel, and this I effect by applying more or less of the protecting composition. Thus, while keeping down the weight to the least degree possible, the effective pressure is still secured. In the old form of springs covered with leather, or other protecting coating, the latter soon becomes offensive from the effects of perspiration and dirt, and, as it cannot be washed, the frequent changing of the springs becomes necessary. By my method of making the springs this is wholly avoided as the composition covering is not affected by the wear and its surface may be kept always pure by washing.

The gutta percha or rubber composition is applied in a plastic state to the spring and is molded thereon to the thickness requisite for giving the degree of pressure in the spring, said springs being made generally of one thickness and temper for all full sized trusses, and their power varied, as above stated, by the quantity of composition. In the figures is shown a spring thus prepared, to which the pads are to be attached by screws as usual, the cross section Figure II showing the interior, of spring-metal, and the contour, of the covering applied thereto.

The steel strip for the spring is first formed into the requisite shape, then the holes in its ends are punched, after which it is tempered and the surface thoroughly cleaned. The composition of rubber &c. is then applied to coat the spring and is afterward vulcanized and cured as usual.

I am aware that the springs of trusses have been coated with matters which were impervious to moisture and thus prevented the corrosion of the metal, as well as preserved the desired cleanliness, but none of these have effected in any degree the stiffness or elasticity of the springs they were employed to coat.

I have described the spring as composed of steel and of gutta percha or india rubber vulcanized thereupon to the character of "hard rubber," but I presume that other substances may be suggested which shall possess the qualities of either of these—the chief requisite being that the composition employed for the covering shall give to the metal an increase of stiffness in proportion to the quantity put on whereby truss springs of differing degrees of elasticity may be made from metal pieces of similar weight and temper. This temper may therefore be so low that the danger of breaking shall be entirely obviated.

I claim—

Constructing springs for trusses in the manner and for the purposes substantially as set forth herein.

J. W. RIGGS.

Witnesses:
I. H. MAYNARD,
GEORGE H. MOTT.

[FIRST PRINTED 1911.]